United States Patent
Nagy et al.

[15] 3,666,216
[45] May 30, 1972

[54] THEFT-PROOF SELF-CONNECTING LOCK COUPLING DEVICE FOR HELICOPTERS AND TOW SUBMARINES

[72] Inventors: Charles E. Nagy, 3221 Benda Place, Hollywood, Calif. 90028; John F. Nagy, 785 West End Ave., New York, N.Y. 10025

[22] Filed: Aug. 19, 1970

[21] Appl. No.: 65,097

[52] U.S. Cl. ................................ 244/137, 244/118, 294/83 R, 294/86 R, 294/83 AB
[51] Int. Cl. ............................................................. B64c 1/22
[58] Field of Search ............... 244/137, 118; 294/78 R, 78 A, 294/82, 83 R, 83 AB, 86 R; 287/87

[56] References Cited

UNITED STATES PATENTS

| | | | |
|---|---|---|---|
| 3,032,365 | 5/1962 | Campbell | 294/83 AB |
| 3,319,978 | 5/1967 | Melhose | 294/83 R |
| 3,154,337 | 10/1964 | Walker | 294/83 R X |
| 3,445,133 | 5/1969 | Reisehl | 294/83 R |
| 3,598,341 | 8/1971 | La Roe et al. | 244/118 R |

Primary Examiner—Duane A. Reger
Assistant Examiner—Carl A. Rutledge
Attorney—Polachek & Saulsbury

[57] ABSTRACT

This is a two part theft-proof, self connecting lock coupling device for use with helicopters and trailer submarines by which the coupling parts can be readily centered with one another and the grip members of one coupling part extended about a ball-shaped head of the hitch pin on the other part and lock devices associated with the one coupling part to hold the grip members upon the hitch pin so long as the coupling device in the case of the helicopter has the load suspended with the cable under strain and wherein the lock devices are automatically released when the load is placed upon the ground and the strain of the cable released, and wherein the grip devices will upon release of the lock devices automatically function under spring action to release the hitch pin. The hitch pin on the other coupling part as a result of this action is automatically released and its trigger pin extended to close a switch and effect automatically the retraction of the hitch pin so that the hitch pin is made unavailable for further connection with the one coupling part bearing the grip members until the hitch pin is extended by one who has a lock key to the coupling part to throw a switch which will drive the electric motor to operate a jack screw that will extend the hitch pin. The submarine trailer coupling device is automatic in the retraction of the hitch pin on the trailing part, but the tow coupling part is operated by an air cylinder device working directly upon the grip members of the same between coupled and decoupled positions.

11 Claims, 11 Drawing Figures

THEFT-PROOF SELF-CONNECTING LOCK COUPLING DEVICE FOR HELICOPTERS AND TOW SUBMARINES

This invention relates to theft proof coupling devices for helicopter cargo pick up cables and trailer tanker submarines.

It is a principal object of the present invention to provide such theft proof coupling devices for helicopters and submarines in which the hitch pin on one of the coupling parts is automatically retractable upon release of coupling parts so as to render the coupling devices inoperable when they are separated from one another, and thereby to prevent theft of the goods containers lifted by the helicopters or submarine tankers trailed by a tow submarine and other tankers.

It is another object of the invention to provide a theft proof two part helicopter self-connecting coupling device having latch devices for preventing the actuation of the gripping members adapted to engage the ball-shaped head of a hitch pin on the other coupling part so that they are positively locked so long as the goods containers are being lifted and the helicopter cable is under strain, and only released when the goods have been landed upon the ground wherein upon the release of the cable and the lock devices and decoupling of the coupling parts the container coupling part will automatically have its hitch pin retracted and can be conditioned for use only by one who has the key to the coupling part and the coupling part actuated to extend the hitch pin.

It is still another object of the invention to provide a theft proof coupling device for helicopters and submarines in which a hitch pin on one of the coupling parts is automatically retracted upon release of the coupling parts wherein a trigger pin in the hitch pin normally retracted by the parts being coupled will be again retracted after triggering the retraction of the hitch pin automatically by solenoid means.

It is a further object of the invention to provide this coupling device in which the coupling parts when being joined are self-centering in themselves so that picking up by the helicopter or of the submarine tanker can be effected automatically and without need of great manual steering of the parts to join them together.

Other objects of the invention are to provide a two part automatic coupling device having the above objects in mind, which is of simple construction, durable, has minimum parts, shaped to permit easy centering of the parts to one another, efficient and effective in use.

For a better understanding of the invention, reference may be had to the following detailed description taken in connection with the accompanying drawing in which.

Referring now particularly to the helicopter coupling device shown in FIGS. 1 to 5, 15 represents a typical work helicopter or sky lift from which a cable 16 is suspended that has the present two part theft-proof self-connecting coupling device indicated generally at 17. This coupling device 17, generally comprises a top coupling part 18 that is separable from a bottom coupling part 19 that overlies a cargo or goods container 21 and connected thereto by four rigid struts 22 respectively running to and fixedly connected to the respect corners of the container at 23. This bottom coupling part 19 overlies the center of the container 21 so that the part 19 is rigidly held when effecting the engagement of the upper coupling part 18 therewith in an automatic manner to be described and merely by drop centering the coupling part 18 upon the bottom coupling part 19 without the aid of a workman and dependent upon the skill of the helicopter pilot, providing the bottom coupling part has been conditioned for this coupling action by the one who controls the goods and in the manner that will be apparent as the description proceeds.

Figures 1, 2:
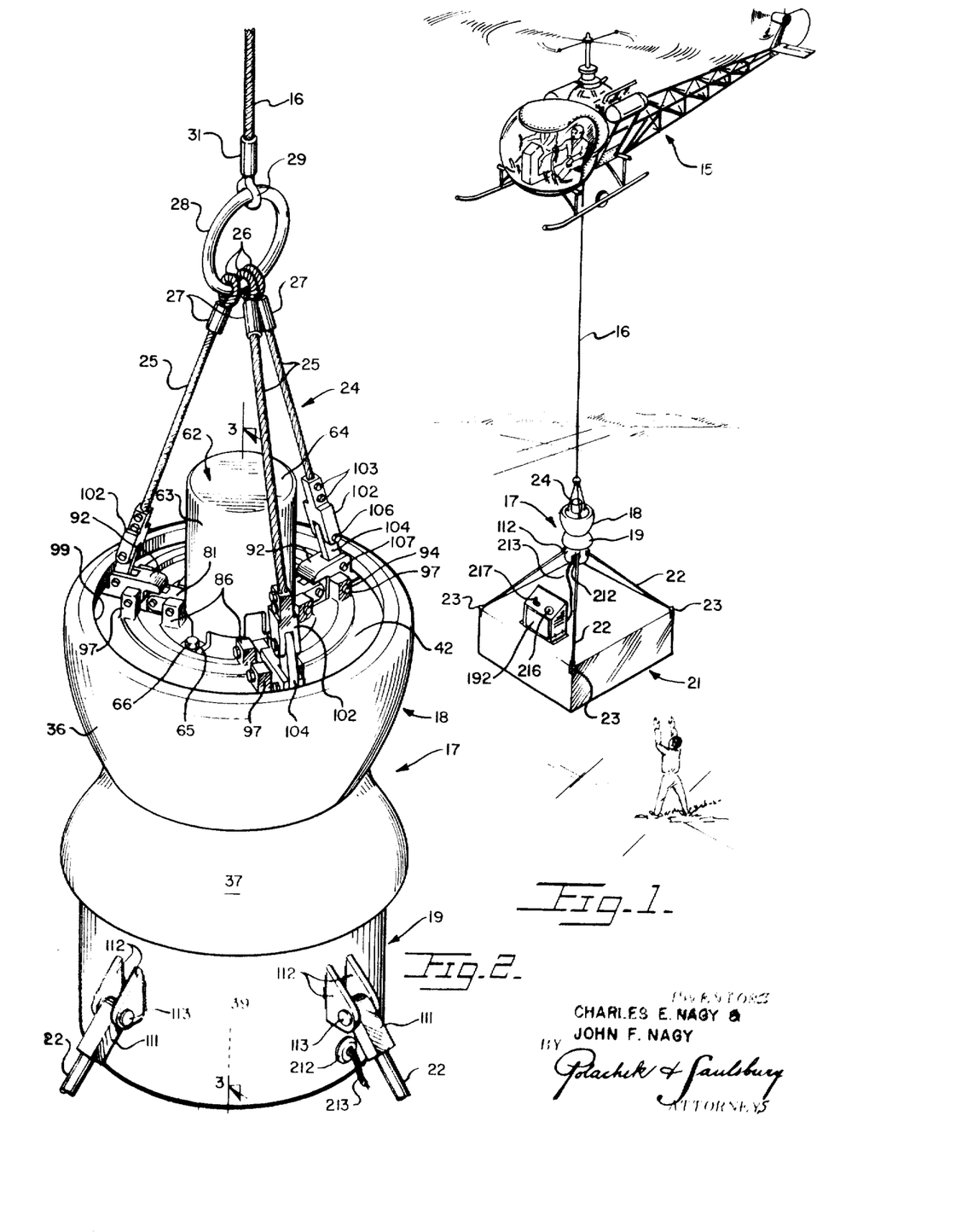
FIG. 1 is a perspective view of a helicopter with a suspended releasable coupling device holding in suspension an enlarged goods container.
FIG. 2 is an enlarged top perspective view of the releasable helicopter coupling device embodying the features of the present invention.

As best seen in FIG. 2, the upper coupling part 18 is connected to the lower end of the cable by a triple steadying short cable suspension indicated generally at 24 and including three cables 25 fanning outwardly from their connection by means of cable loops 26 formed of the cable and sleeve clamps 27 to a bull ring 28 that is connected to the cable 16 by an eye loop 29 of the cable and a sleeve clamp 31.

Figure 3:
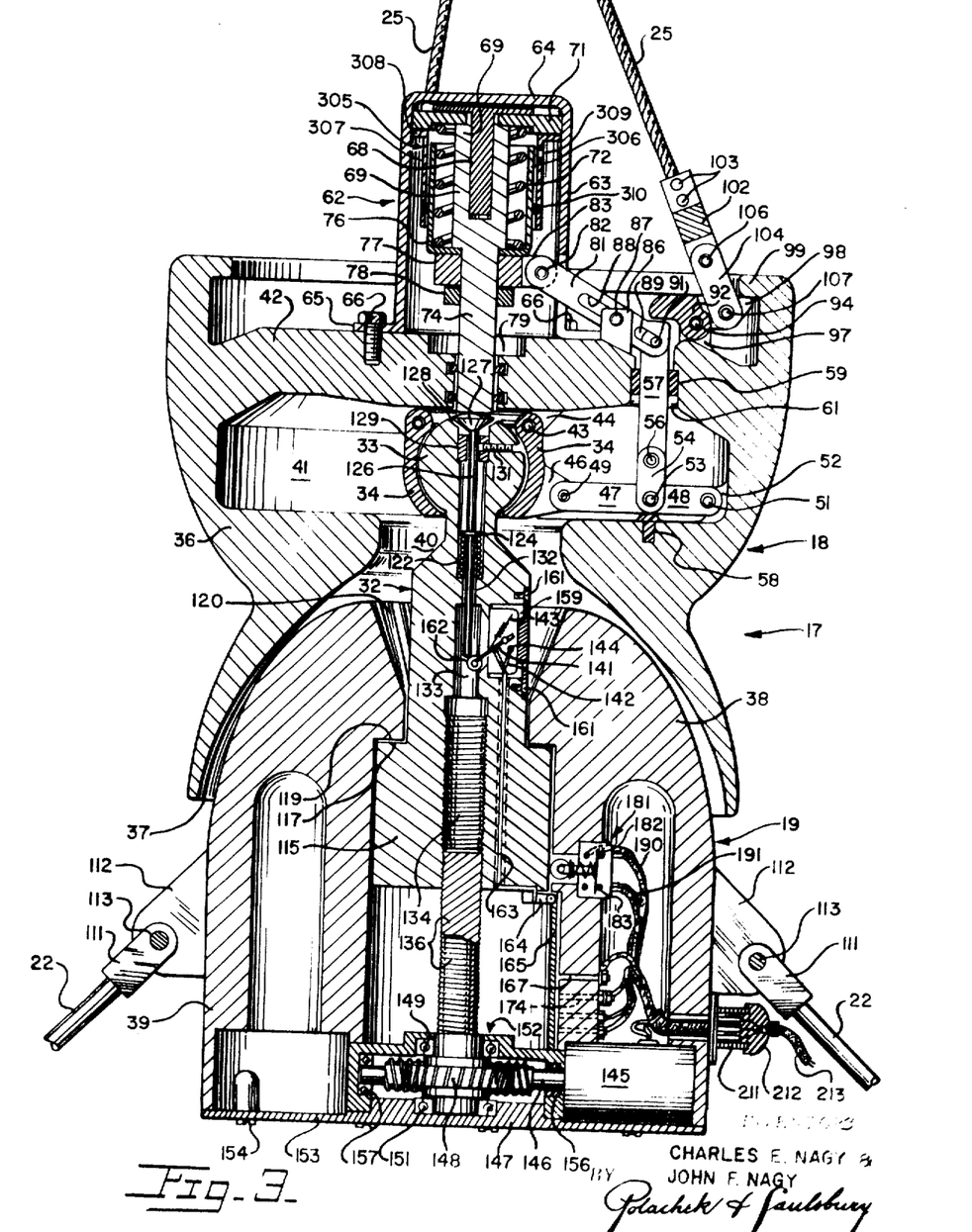
FIG. 3 is an enlarged vertical sectional view of the helicopter coupling device as viewed on line 3—3 of FIG. 2 and showing the grip parts of the coupling device coupled with one another.
Figures 4, 5:
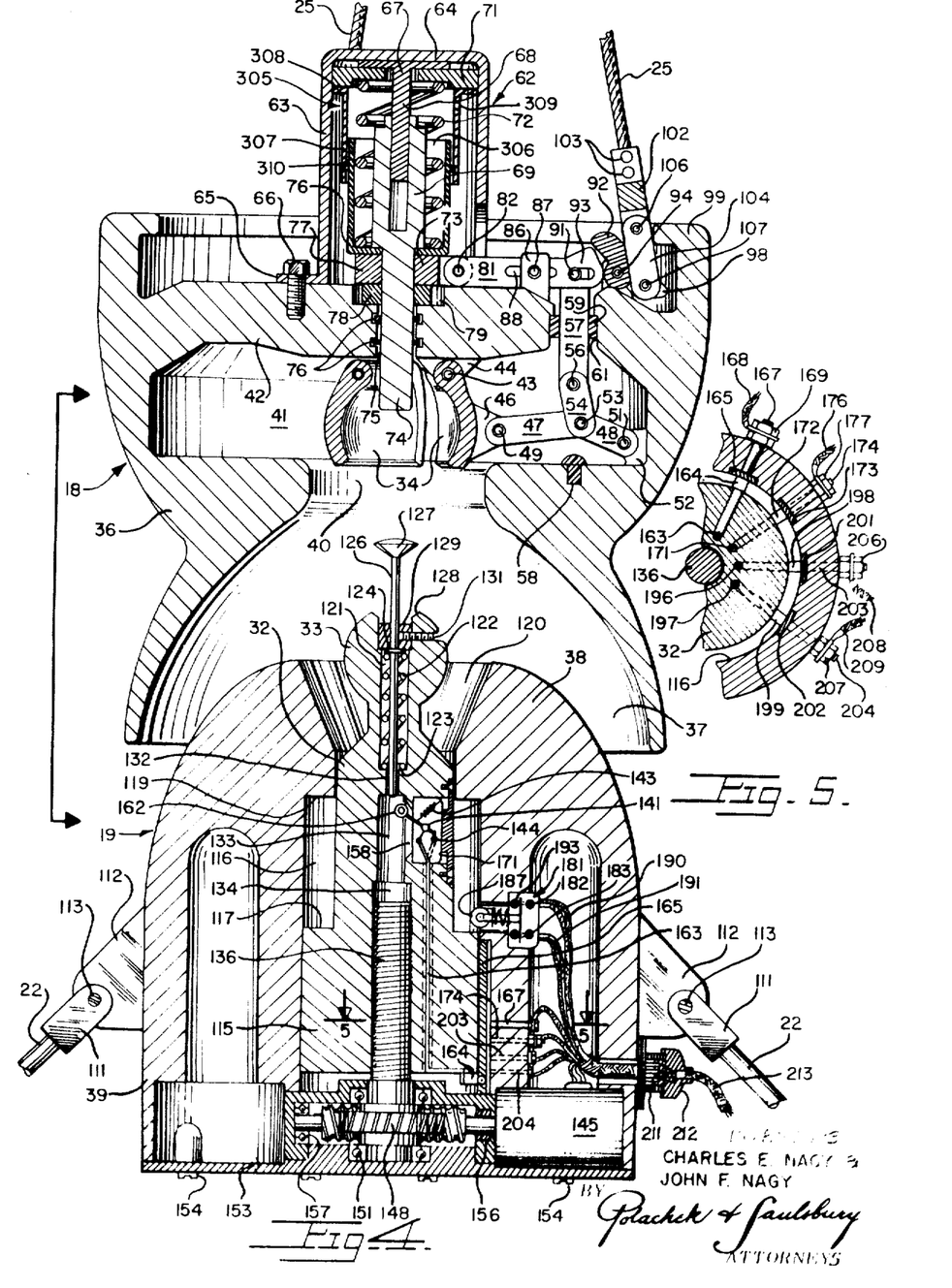
FIG. 4 is a similar vertical sectional view as shown in FIG. 3, but with the coupling parts of the device released from each other and the grip parts opened and the hitch pin retracted.
FIG. 5 is a fragmentary transverse sectional view of the lower coupling part as viewed on line 5—5 of FIG. 4 and showing electrical contact parts.
Figure 6:
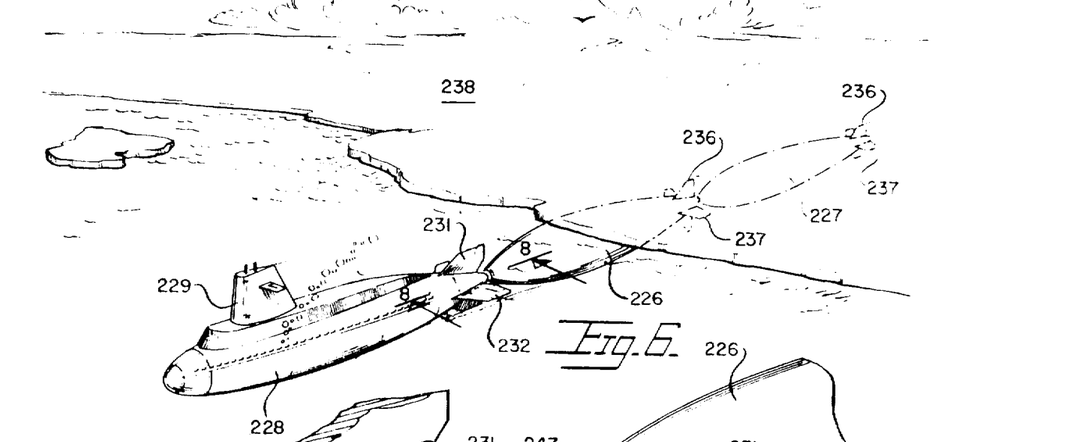
FIG. 6 is a perspective view of a tow submarine train, incorporating the coupling devices of this invention according to another form thereof and by which the submarine and trailer containers are coupled together.

The top coupling part 18 will hang free from the helicopter 15 as shown in FIG. 4, when detached from the bottom coupling part 19 to allow the helicopter to pick up other containers having on them the hitch pin protruding from bottom coupling part 19 in much the same manner as wheeled trailer tractors or truck vehicles are connected to depending hitch pin coupling posts on the forward end of automotive trailers. There can be theft of containers of good such as in the military of helicopter devices as is often done today with vehicle trailer tractors and trailers and this problem, delt with in our copending application Ser. No. 5268 and filed Jan. 23, 1970, and now it is the principal purpose of this invention to cope with theft problems of this nature with air helicopter coupling devices, and sea trailer submarine, or even surface shipcraft coupling devices. The container bottom coupling part 19 as with a trailer includes a retractable post or hitch pin 32 having a ball-shaped head 33, FIGS. 3 and 4, while the upper coupling part 18 has depending articulated grip parts 34 adapted to be hitched to the ball-shaped end of the retractable hitch pin 32 only when the hitch pin 32 is extended and thereby to effect a lift connection of the upper coupling part 18 with the bottom coupling part 19 by which the goods container 21 can be lifted.

The top coupling part 18 has a cast body 36 that is especially shaped for easy attachment with the bottom coupling part 19 and with the triple cable suspension 24. The bottom of the cast body 36 is skirted to provide a major centering opening surface 37 with which a rounded nose portion 38 of a main body 39 of the bottom coupling part 19 bearing the retractable post or hitch pin 32, to center its ball-shaped head 33 for engagement with the grip parts 34 of the top coupling part 18. The retractable hitch pin 32 when the nose portion 38 of the bottom coupling part 19 is centered within the skirted wall surface 37 of the top coupling part, is projected through a restricted central opening 40 of the top coupling body 36 to locate the ball-shaped head 33 of the hitch pin 32 in proper position within the upper coupling part 18 to be readily gripped by the grip parts 34 of the top coupling part 18 and within an enlarged space 41. The three grip parts 34 are curved on their inner faces to conform to the ball-shaped head 33 of the bottom part 19 when closed thereupon so as to effect lifting action thereupon.

Each of the depending grip parts 34 are pivotally connected at their upper ends by a pivot pin 43 to a pair of spaced bosses depending from a transverse top wall portion 42 of the body 36 into the coupling space 41. Extending laterally outwardly from the lower ends of each grip part 34 are boss portions 46 to which link 47 of two toggle links 47 and 48 are pivotally connected by a pivot pin 49. The toggle link 48 is connected by a pivot pin 51 to boss portions 52 extending inwardly from the vertical side wall of the space 41. The two toggle links 47 and 48 are pivotly connected together by a toggle pin 53 and by this same pin there is connected a short opening link 54 that is in turn connected by a pivot pin 56 to a vertically extending long operating link 57. A round headed bumper pin 58 extends from the bottom wall of the space 41 upwardly under the joined ends of the toggle links 47 and 48 to limit the overcenter toggle movement of these links in a downward direction as when the grip parts 34 are closed about the ball-shaped head 33, of pin 32 and make locking engagement therewith, as best shown in FIG. 3.

The vertically extending operating link 57 is slidable through a bearing ring 59 mounted in a verticle hole 61 in the top wall portion 42 of the top coupling body 36 and through this bearing 59 the operating link 57 can be axially worked. Mounted upon the top of the wall portion 42 is a spring actuating device 62 that serves to operate the vertical toggle operating links 57 and the grip coupling parts 34.

This spring-actuated device 62 comprises an inverted cup-shaped housing 63 closed at its upper end at 64 and has a bottom outwardly extending flange 65 through which attaching bolts 66 extend to secure the housing 63 to the top surface of the transverse top wall portion 42. In the upper end of the actuator housing 63 and against the closing end 64, there is retained a flat-headed spring plunger guide member 67 having a depending guide shank 68 along which a spring plunger guide 69 is worked and retained by the guide member 67 in an axially adjustable manner and against lateral displacement. The flat-headed depending guide member 67 is retained in the housing 63 against the upper end 64 thereof by an annular tight fitting retaining member 71 that is recessed to serve as an abutment for the upper end of an actuating compression spring 72.

The spring guide 69 is disposed within the compression spring 72 and has a shoulder 73 and a plunger depending shank 74 that depends through an opening 75 that has appropriate guide bearing members 76 and in the top wall portion 42 centrally thereof and adapted to be thrust downwardly into the space 41 to act upon the ball-shaped head 33 of the bottom coupling part 19 and centrally through the grip members 34 to eject the top part 18 from the bottom part 19 when the spring 72 is released from its compressed state.

The shoulder 73 of the plunger spring guide 69 engages an annular bottom spring plate 76 that surrounds the plunger shank 74 and seats the lower end of the spring 72. Below this spring plate 76 is a tight fitting spider ring 77 that surrounds the plunger shank 74 and an annular rubber bumper ring 78 adapted to engage the top surface of the housing wall portion 42 within a recess 79 to cushion the action of the spring 72 upon the spring guide 69. The actuator housing 63 has openings adjacent to the flange 65 through which extend long pivot links 81 attached at their inner ends by pivot pin 82 to lug formations 83 on the periphery of the spider ring 77 of the spring-actuator device. Adjacent each of the top wall openings 61 vertical toggle operating link 57 and extending upwardly from the top portion 42 are vertically extending bosses 86 serving as a fulcrum for the pivot link 81 extending from the actuating device spider. This fulcrum is provided by a pin 87 extended through the boss portion 86 and elongated slot 88 of the link 81 to allow the link 81 to be pivoted and worked with spider ring 77. The outer end of the link 81 has an elongated slot 89 and the link is connected by a pivot pin 91 to effect a lifting action upon the vertically slidable toggle operating link 57.

It should now be apparent that upon spring 72 of the actuator being released, the inner ends of the actuating links 81 will be depressed and the vertically slidable operating links 57 are elevated to break upwardly the toggle connection of the toggle links 47 and 48 so as to separate the grip members 34 and release the ball-shaped head 33 of the hitch pin 32 of the bottom coupling part 19. The release of the compression spring 72 can only be permitted when the strain is taken from the triple short cables 25 and main cable 16 as when cargo or the goods container 21 carried by the coupling 17 has been on the ground and ready to be detached from the helicopter. The upward strain on each of the short cables 25 maintains locking levers 92 pivoted against a raised abutment 93 on the outer end of the actuator link 81 which on acting through the pivot pin 91 will hold downwardly the vertically slidable operating link 57 and the toggle links 47 and 48 pivoted downwardly and against the abutment pin 58.

The locking levers 92 are short and pivoted intermediate their ends by a pivot pin 94 and within an annular space surrounding the top portion 42 on raised boss portion 97 on the top portion 42. These locking levers 92 when pivoted to their locking positions, shown in FIG. 3, to hold the actuator spring 72 compressed in its housing 63, will have their outer ends 98 engage an inturned lip or flange 99 overlying the top wall portion 42. The short cables 25 are connected by a clamp coupling 102 secured to the cable 25 by clamp screws 103. This cable clamp 102 is bifurcated to receive a working link 104 that is connected to the cable clamp 102 by a pivot pin 106 that is in turn connected to the locking lever 92 by a pin 107. Thus, under the weight of the container and with lifting strain put on the cables, the locking levers 92 will, as shown in FIG. 3, keep the actuator spring 72 compressed and free from actuation to eject the hitch pin 32 and bottom part 19 and from being downwardly extended as shown in FIG. 4, the toggle links 47 and 48 having been broken and the grip parts 34 released.

With the grip parts 34 released, as shown in FIG. 4, the depending plunger shank 74 of the spring guide 69 of the actuator is thrust downwardly through the opening 75 under the action of the spring in the top portion 42 and bodily ejects the top coupling 18 from the bottom coupling part 19 lifting the top coupling part 18 upwardly therefrom. As this is done, the top coupling part 18 can be taken away by the helicopter. As this is done the retraction of the hitch pin 32 will be automatically effected and the bottom part conditioned so that the goods container cannot be lifted by the same top coupling part 18 of that helicopter or similar one from another helicopter without the hitch pin 32 being extended by unlocking the retracted hitch pin 32 by one in control of the goods container preparatory to making another coupling connection. The mechanism for effecting this theft-proof feature will become apparent as this description proceeds.

As above explained, the bottom coupling part 19 is rigidly supported upon the square-shaped goods container 21 through the four rigid rods 22 respectively extended and secured to the respective four corners thereof. The lower ends of the rods 22 may be connected to the corners by any suitable means at 23 but for the connection of the upper ends of the rods 22, there is fixed an enlarged coupling member 111 that is connected between pairs of lug extensions 112 on the sides of the bottom part 19, by pins 113. This lower coupling part 19 with rods 22 can be removed from the container and placed upon another similar container or can be built into the container. Detachable connections 23 can be provided at corners of the container 21, which can be detached for effecting the removal of the lower coupling part from its rigid connection with the container 21.

The lower coupling part 19 is made as a rigid cast body 39 having the rounded nose portion 38 for centering the coupling parts with one another and contains the retractable hitch pin 32 which is retracted and extended by a reversible electric motor operating mechanism to now be described. This hitch pin 32 has an enlarged diameter portion 115 that is slidable within cylindrically shaped recess 116 of the same diameter, and providing a shoulder 117 that as the hitch pin is extended will abut a corresponding shoulder 119 within the rounded end portion 38 of the bottom main body 39. The nose portion 38 has a flared opening 120, into which the ball-shaped head 33 of the hitch pin 32 is retracted to the position shown in FIG. 4 and from which it is extended to its hitch position shown in FIG. 3 for the purpose of making possible the connection with the grip parts 34 and the upper coupling part 18.

Extending vertically and axially through the ball-shaped head 33 is a small spring opening 121 that contains a small compression spring 122 that abuts a shoulder 123 at the lower end of the spring opening 121 and reacts against a flange 124 carried on a vertically slidable trigger pin 126 that has a conical head 127 to fit a flared end opening 128 of the spring opening 121 in the ball-shaped head 33 as shown in FIG. 3.

As the top coupling part 18 is released from the bottom coupling part 19 from the position shown in FIG. 3 to the position shown in FIG. 4, the headed trigger pin 126 is extended by the compression spring 122 until its flange 124 engages a stop retainer 129 held in the upper end of the hitch pin spring opening 121 by a laterally extending fastening screw 131. The lower end of the trigger pin 126 is slidable through a restricted hole 132 extending downwardly from the bottom end 123 of the spring opening 121 and into a further enlarged diameter opening 133 below which is a larger diameter opening 134 that is internally threaded to receive a threaded jack shaft 136 that when turned one way or the other will extend or retract the hitch pin 32.

The lower shank end 74 of the actuator spring guide 69 when the parts are coupled together depresses the trigger pin 126 downwardly into the hitch pin ball-shaped head 33 so that its spring 122 is compressed as shown in FIG. 3, but as the upper coupling part 18 is unlocked from locking levers 92 and is lifted from the bottom coupling part 19 by the actuator spring 72, as shown in FIG. 4, the trigger pin spring 122 will lift the trigger pin 126 to the position shown in FIG. 4, so as to release a switch arm 141 of a one-way switch 142 biased to its raised position as shown in FIG. 4 by a tension spring 143 and against a contact 144 in the switch 142 so that a reversible electric motor 145 is rotated to turn the jack screw 136 in a direction that will retract the hitch pin 32 into the bottom coupling part 19 so that it is unavailable for coupling with the top coupling part 18 until steps are taken by one in control of the goods container for conditioning the bottom coupling for further pick up.

The reversible electric motor 146 may be driven slowly or have appropriate reduction gearing to slowly drive its shaft 146 extending therefrom with a drive worm 147 which meshes with a worm wheel 148 carried on the lower end of the threaded jack screw 136. The jack screw 136 is journaled in upper and lower ball bearings 149 and 151 provided in a bottom gear housing assembly 152 mounted in the lower end of the main body 39 and to which access can be had upon removal of a bottom closure plate 153 held in its closed position by fastening screw 154. The motor 146 is removable from the bottom part with the housing 152 and its worm driven shaft 146 is journaled in a bearing 156 adjacent the motor 146 at one side of the gear housing 152 and its other end journaled in bearing 157 at the opposite end of the housing 152. The electric motor 145 when turned in one direction will turn the jack screw 136 in one direction retracts the hitch pin 32 to the position shown in FIG. 4 as explained above or when rotated in the opposite direction at the will of the one who controls the goods container, extend the hitch pin 32 to the position shown in FIG. 3 in a manner to be described, so that its ball-shaped head 33 can be conditioned to be gripped by the gripping pats 34 of the top coupling part 18.

The motor switch 142 is retained in a recess 158 in the hitch pin 32 to travel therewith by a closure plate 159 secured to the hitch pin 32 by fastening screws 161. The switch arm 141 extends into the opening 133 under the lower end of the trigger pin 126 so that its roller 162 will be engaged by it and held in its lowered position as shown in FIG. 3 against the action of its operating spring 144 so long as the hitch pin is extended into the top coupling part and retained by the grip parts 34 thereof. The contact arm 141 is connected by a cable 163 that extends downwardly through the hitch pin and laterally to a slide contact 164 that engages a vertically extending stationary contact strip 165 disposed on the wall surface of the cylindrical-shaped recess 116 and connected by a cable connecting member 167 that extends through an inner portion of the bottom body 39 into an annular space 167 and to which an electric cable 168 is fastened by nuts 169, FIG. 5.

The stationary contact 144 of the switch 142 which when the arm 141 is raised is contacted to close a circuit is connected through a cable 171 extending downwardly through the hitch pin 32 and laterally to a sliding contact 172 that will engage with a vertically extending fixed contact strip 173 from which a cable-connecting member 174 extends for connection with a cable 176 by means of fastening nuts 177.

In order to stop the electric motor 146 after retracting the hitch pin 32, a stop switch 181 normally closed by the enlarged portion 115 of the hitch pin, as best shown in FIG. 3, and serves to turn off the motor at the end of the retracting stroke of the hitch pin 32. This stop switch 181 has spaced contacts 182 and 183 that are bridged by a switch member 184 carried on a spring-biased plunger shaft 186 having a roller 187 that engages the large diameter portion 115 of the hitch pin 32, when extended. The roller 187 is urged towards the hitch pin 32 by a compression spring 188 reacting between the switch housing and a flange 189 on the shaft 186. The roller 187 rides along the surface of the hinged pin portion 115 until it rides off shoulder 117 thereof so as to suddenly disengage the contacts 182 and 183 and open a motor circuit including the trigger pin switch to stop the motor when the hitch pin has been retracted. Thus, the electric motor 142 is arrested and the hitch pin ball shaped head 33 will be withdrawn into tapered opening 120 in the rounded nose portion 38 of the bottom coupling part 19 so that the upper coupling part cannot thereafter be connected to the bottom coupling part without again extending the hitch pin 32 to its extended position shown in FIG. 3. Cables 190 and 191 extend respectively from the respective contacts 182 and 183 of switch 181 to the motor 146, battery source 192 and trigger switch 142.

Figures 10, 11:
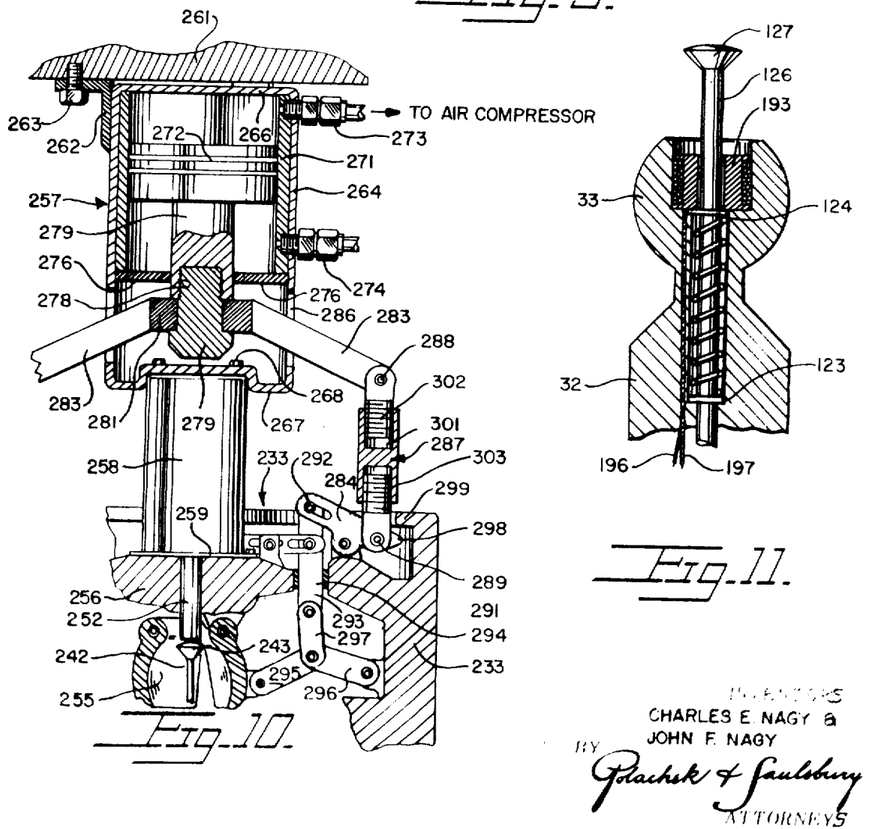
FIG. 10 is an enlarged longitudinal sectional view taken generally on line 10—10 of FIG. 7 and showing a pneumatic cylinder device for effecting the locking and actuation of the coupling grip parts on the tow submarine.
FIG. 11 is a fragmentary and longitudinal sectional view of a modified retractable hitch pin, having a solenoid for automatically retracting the trigger pin as the hitch pin is retracted to eliminate the possibility of breakage of the trigger pin.

The trigger pin 126 may remain extended, but in order to prevent possible breakage of the same while in the extended position and according to a modification, a solenoid retainer 193 replaces the stop retainer 129 in the ball-shaped head 33 of the hitch pin 32 will be energized by the limit switch 181 which has a pair of contacts 194 and 195 that will have become bridged by the switch member 184 under the action of compression spring 188 and upon the roller 187 falling over the shoulder 117 of the enlarged hitch pin portion 115. The solenoid 193 will remain energized to keep the trigger pin 126 retracted and the switch 142 in its open position. This switch 142 is closed only when the trigger pin 126 is extended. Thus, the closing of this switch 142 resulting from the release of the coupling parts will automatically effect reversing rotation of the electric motor 146, the retraction of the hitch pin 32 and now the retraction of the trigger pin 126 as well.

Extending from the solenoid 193 and respectively from the respective contacts 194 and 195 are cables 196 and 197 that pass downwardly through passages in the hitch pin and are respectively connected to slide contact members 198 and 199 that respectively slide upon vertically extending contact strips 201 and 202. These contact strips 201 and 202 respectively, have connecting members 203 and 204 with fastening nuts 206 and 207 from which cables 208 and 209 respectively extend. These cables 208 and 209, as well as all other cables, are connected into the general circuit as best shown in the wiring diagram of FIG. 9.

Figure 9:
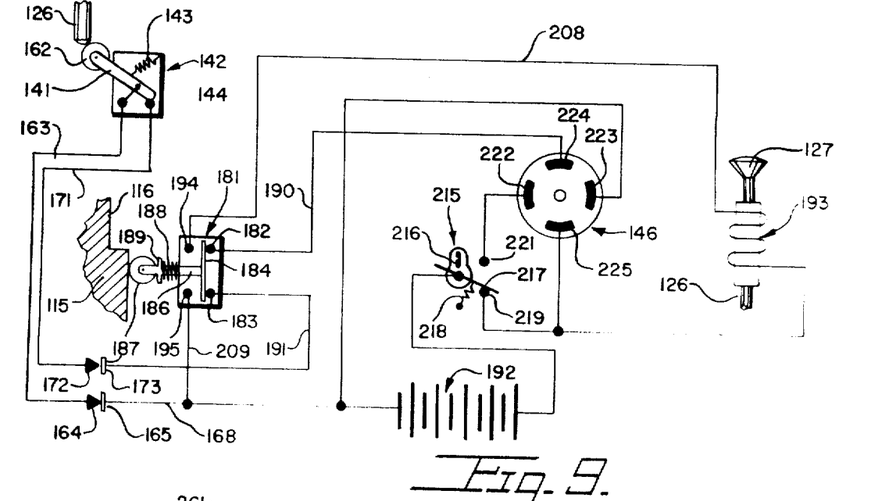
FIG. 9 is a diagrammatic wiring diagram of the automatic electric control system employed in effecting the automatic retraction of the hitch pin of the one coupling part and the extending of the hitch pin preparatory to the recoupling of the parts together.

All cables extend outwardly from the side of the bottom coupling part 19 through a plug receptacle connection 211 and a plug 212 which a multiple cable 213 extends to a battery power unit 192 releasably resting upon the top of the container 21, as seen in FIG. 1, and which has a two-way lock switch 215, with a key-operating lock 216 shown diagrammatically in the wiring diagram FIG. 9, and which has a switch arm 217 biased by a tension spring 218, acting upon a switch arm 217 to a retraction contact 219 that includes the reversing circuit of the electric motor 146 whereby the hitch pin 32 will be normally kept retracted through the circuitry above described.

In order to extend the hitch pin 32 and to re-condition the bottom part 19 for use again with the top coupling part 18, the lock switch 215 is unlocked by a key held by the one in control of the goods container 21 and the switch arm 217 is turned against action of spring 218 to a contact 221 that passes through motor brush terminals 222 and 223 that will effect the operation of the motor 146 in a forward direction to turn the jack screw 136 so as to extend the hitch pin 32 outwardly to its extended position as shown in FIG. 3 and preparatory to making a coupling connection of the top coupling part 18 to the bottom coupling part 19. So long as the switch arm 217 is upon the reversing retraction contact 219, current will pass through bruch terminals 224 and 225 and the solenoid 193 that holds down the trigger pin 126 against the action of its spring 122 upon movement of the switch arm 217 to contact 221, the solenoid is de-energized and the trigger pin 126 will be released and extended by its spring 122 for again causing the trigger pin 126 so that it can be depressed as the top coupling part 18 is extended over the lower coupling part 19 to such an extent so that the head 127 of the pin will engage with the spring actuator plunger extension 74 as the weight of the top coupling part 18 settles down over the bottom coupling part 19 the spring actuator plunger 69 is upwardly pressed and the actuating spring 72 compressed and the links extending from its spider ring 77 will be pivoted up so that their outer ends will depress the vertically extending pins 57 operated to lower the toggle links 47 and 48 against the abutment 58 and close the grip parts 34 upon the ball-shaped head 33 of the hitch pin 32. Thus, the connection of the upper coupling part 18 is made with the lower coupling part 19.

As tension is taken up on the cable 16 and on the short cables 26, the lock levers 92 will be pivoted to the locking positions, shown in FIG. 3, to maintain the levers 81 pivoted to hold the toggle links 47 and 48 down and locked against the action of the actuator spring 72 and the grip parts 34 closed upon the hitch pin ball-shaped head 33. As the load settles down and a slack is given in the cables, the actuator spring 72 is released and its plunger extension 74 will eject the upper coupling part 18 from the hitch pin 32 allowing the trigger pin 126 to again be elevated and the motor circuit energized to effect rotation of the electric motor 146 in the reverse direction and the retraction of the jack screw 136 to retract the hitch pin 32. The hitch pin 32 is automatically retracted and at the end of the stroke the limit switch 181 will have its contacts 194 and 195 bridged so that solenoid 193 will be energized to retract the pin 126 and keep the same from being extended and free from being ruptured or bent. Only when the cup-shaped receiving surface or skirt portion 37 of the top coupling part 18 has received the nose portion 38 will the pin 126 again be extended for engagement with the plunger extension 74 to thereby prevent breakage of the pin 126 at the time of uniting coupling parts 18 and 19.

While the power unit 192 bearing the lock switch 215, FIG. 1, is shown as a detachable unit upon the container 21 and by the pull of the plug 212, the power cable 213 can be detached and the power unit 192 can be taken away. It is possible that this power unit 192 could be secured directly to the bottom coupling part 19 and made a part thereof with means provided for effecting the charging of its battery. It should now be apparent that always when there is a detaching of a top coupling part, the hitch pin 32 of the bottom part is retracted automatically and then cannot be extended unless one has the key to the unlock switch 215 on the power unit 192.

Referring now particularly to FIGS. 6, 7, 8 and 10, there is shown a two part theft-proof lock coupling device similar to the helicopter coupling device just described, but which has been adapted and constructed for use in the connection of submarine tow tankers 226 and 227 adapted to contain oil and connected with one another and also with a tow submarine 228 that can surface from the water having the ordinary control tower 229 and vertical and horizontally extending fins 232 and 232. At the tail of the tow submarine there is installed one control part 233 corresponding to the top coupling part 18 of the helicopter coupling device and in the tow tanker 226 there is a nose coupling part 234 corresponding to the bottom coupling part 19 thereof, and as well in the nose of the further trailing tanker 227. The tail of each of the tankers while not having any means of propulsion will have respectively vertical and horizontal controls 236 and 237 serving to stabilize the tow tankers in the same manner that the tow submarine 228 is stabilized by its vertical and horizontal fins 231 and 232. Some means will be provided for the tow submarine 228 to effect its propulsion at depths and under ice that is indicated generally at 238 and such as might be found in the Arctic Ocean.

While the submarine coupling parts 233 and 234 are generally similar to the helicopter coupling parts 18 and 19 the tanker coupling part 234 is identical in its operation with the coupling part 19 and actuated in the same manner having hitch pin 240 with a ball-shaped head 241 and a trigger pin 242 with its tapered head 243 adapted to be depressed in its opening 244 in the ball-shaped head 241 of the hitch pin 240.

The tanker coupling part 234 is self-contained and is mounted in a water-proof manner within nose opening 246 in a nose end 247 of a tanker 226 or 227. The housing of the coupling part 234 has a flange 248 that is secured to a bulkhead wall 249 by fastening bolts 251.

Figure 7:
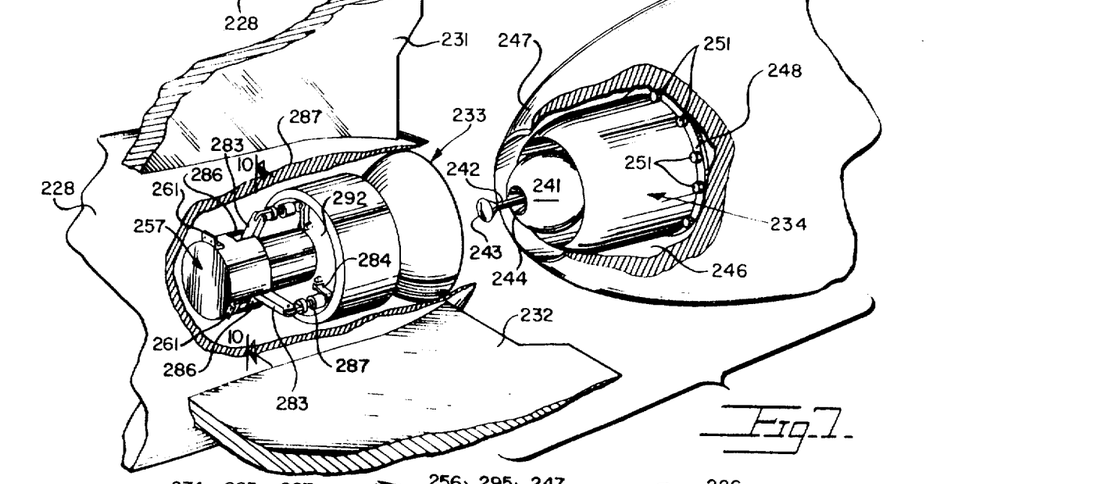
FIG. 7 is fragmentary, perspective and collective view of the tail of the tow submarine bearing one of the coupling parts and of the submarine trailer bearing the other coupling part, the coupling parts being operable with one another in substantially the same manner as the helicopter coupling parts are operable with one another.
Figure 8:
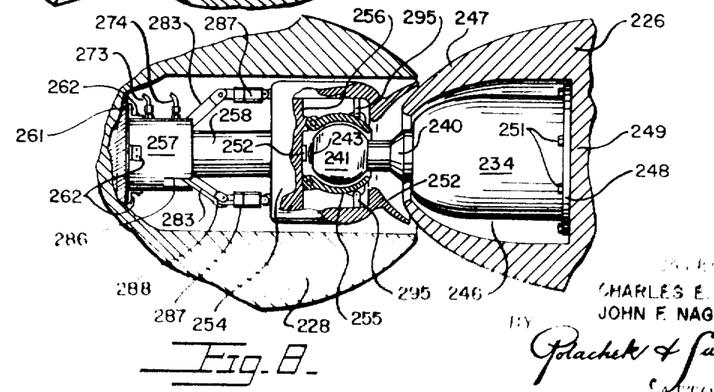
FIG. 8 is an enlarged fragmentary longitudinal sectional view as viewed generally on line 8—8 of FIG. 6 and showing the coupling parts of the tow submarine and tanker joined together.

The hitch pin 240 with its ball-shaped head 241 are extended by a reversible motor in the same manner as above described to assume the position shown in FIG. 8 and will be automatically retracted as the trigger pin 242 when the trigger pin 242 is permitted to be extended, as shown in FIG. 7, as upon release of the trailer coupling part 234 from the two coupling part 233. As the coupling parts 233 and 234 are joined a pin projection 252 will depress and retain the the trigger pin 242 in the ball-shaped head 243, power will be supplied to the reversible motor by any electrical source provided in the tanker and a control of the above described.

While with the coupling parts of the helicopter coupling device are centered by the noise short end the coupling part housing, the rounded nose shaped end of the tanker itself as indicated at 247 can be used for effecting the centering of the tanker submarine with the tail mounted coupling part 233. This nose end 247 will enter an internally rounded surface 252 of the skirted housing of the coupling part 233 in order to center the ball-shaped head 241 of hitch pin 240 so that the trigger reversing pin 242 and its head 243 is forced inwardly against the action of its spring directly by the pin projection 252 on the transverse wall 254 at which time grip members 255 by a two-way air-operated actuator 257 mounted on the forward end of the coupling part 233 by a strut member 258 and secured by its flange 259 and fastening nuts to the transverse wall 256 of the coupling part housing. The strut 258 carries the pin projection 252, which is extended through a hole 260 with transverse wall 254.

This actuator 257 is secured to a bulkhead 261 in the tail of the tow submarine 228 by angle brackets 262 and fastening screws 263 in a strong enough manner to take the pull of the trailing tankers through the coupling part 233.

The actuator 257 comprises an outer case 264 to which the brackets 262 are welded and through which the pull strain in the towing of the tankers is made. This outer case in 264 is integrally closed in its forward end at 266 and at its outer end by a recessed portion 267 to which the strut member 258 is seated and secured thereto by internal screws 268.

The housing 264 is lined with an air cylinder sleeve 271 in which there is worked a piston 272 upon alternately admitting and exhausting air through cylinder pipe fittings 273 and 274, which can be connected to any valve control air compressor system in any suitable manner. The air cylinder sleeve 271 is closed by the forward end portion 266 of the outer case 264 and at its opposite end an annular plate 276 through which piston shank 277 is slidable.

The piston shank 277 has a threaded opening 278 to which a spider bolt 279 is secured to attach a spider member 281 to the piston shank to be worked by it. This spider member 281 has laterally extending work arms 283 for operating the lock lever devices 284, FIG. 10. These spider arms 283 extend laterally outwardly and rearwardly through slots 286 in the outer case 264 and are moved fore and aft by the piston 272.

To the outer ends of the spider work arms 283, adjustable turnbuckle links 287 are pivotally connected by a pivot pin 288. The rearward ends of these links 287 are connected by a pivot pin 289 to operating and lock lever 284 that is in turn pivotally connected to lugs 291 extending forwardly from a transverse wall portion 254 of the coupling part 233. These locking levers 284 are pivotally connected by a pin 292 with long toggle actuating link 293 slidable through bearing 294 in the transverse portion 254 and serving the same purpose as the operating link 57, described above with the helicopter coupling part 19 to hold toggle links 295 and 296 extended to lock the grip members 256 against the ball-shaped head 241 of hitch pin 240 or to release the grip member as the actuating link 293 is pulled forwardly by the air operated actuator 257. The actuating link 293 is connected by a pivot pin 297 with the toggle links 295 and 296.

In order for some of the strain to be taken directly through the coupling housing of part 233 and the toggle links be controlled in their overcenter locking position, the operating and lock lever 284 has its outer end 298 abut an inturned lip 299 of the coupling part housing. The overcenter locking position of the toggle links 295 and 296 can be retained upon wear of the parts by adjusting the turnbuckle device 287 to separate or close, by turning its sleeve 301, its threaded link studs 302 and 303.

It should now be apparent that with both forms of this invention, the bottom coupling part 19 and tanker coupling part 234 has their hitch pins retracted automatically with the release of the other coupling part therefrom and reconditioning of the part for again coupling the parts must be done by one who has a key to the released parts and that theft of the goods container or the submarine tanker is thereby prevented.

In FIGS. 3 and 4 there is shown a dash-pot device 305, consisting of an inner sleeve 306 formed upon the bottom spring plate 76 and an outer sleeve 307 having the top flange 308 anchored to the spring retainer member 71 and having a vent 309. This outer sleeve 307 is sealed by a sealing ring 310 to prevent the passage of air between the inner and outer sleeves. The air vent 309 will throttle the air in and out of the dash-pot device 305 to keep thereby the control of the spring 72 and the opening of the grip members 34 in momentary negative gravity loads, while an air tight dash-pot is being shown it would be apparent that any such dash-pot, such as a liquid filled one, may be used.

What is claimed is:

1. A theft-proof, self-connecting lock coupling device for use with helicopters, tow submarines and the like, comprising one coupling part adapted to be connected to the helicopter or submarine comprising a coupling body, grip members carried by the coupling body and means operable upon the coupling part body and connected with the grip members to effect a gripping engagement with a hitch pin of another coupling part, another cooperating coupling part comprising a coupling body, a hitch pin adjustable in said body between extended and retracted positions and power means connected to the coupling body to move said hitch pin between the two positions, said hitch pin when the coupling parts are aligned with one another being adapted to be received by the grip members of the one coupling part, said power means for operating the hitch pin including a device operable in response to the uncoupling of the coupling parts to cause the hitch pin to be automatically retracted and to lock the hitch pin in its retracted position and a key-operated device actionable upon the hitch pin to unlock the power operating means to permit extension of the hitch pin only at the will of the one in control of the goods container being lifted by a helicopter or a tanker towed by the submarine.

2. A theft-proof, self-connecting lock coupling device for use with helicopters, tow submarines and the like, as defined in claim 1 and said one coupling part having a skirted centering portion and said other coupling part body having a rounded nose portion adapted to be centered by the skirted portion of the one coupling part as the coupling parts are being joined together, said hitch pin of the other coupling part being positioned for engagement by the grip members upon the coupling parts having been centered with one another.

3. A theft-proof, self-connecting lock coupling device for helicopters, tow submarines and the like, as defined in claim 2, and said means for operating the grip members of the one coupling part being carried thereby, but being actuated by the hitch pin of the other coupling part upon the same being extended to force the grip members upon the hitch pin and to thereby finally couple the one coupling part with the other coupling part.

4. A theft-proof, self-connecting lock coupling device for helicopters, tow submarines and the like, as defined in claim 3 and said means for operating the grip members including a compression spring-actuated device carried upon the one part, having a plunger shank depending into and between the grip members thereof and engageable by the hitch pin when being extended from the other part to be actuated by the hitch pin so as to compress the spring and effect automatic engagement of the grip members upon the extension of the hitch pin.

5. A theft-proof, self-connecting lock coupling device for helicopters, tow submarines and the like, as defined in claim 4 and toggle link members actionable upon the grip members, linkage means extending between the compression spring actuator and the toggle link members to place the toggle links into over center locking position upon the spring being compressed by the hitch pin to hold the grip members upon the hitch pin, said compression spring upon the coupling device being released from the helicopter serving to uncouple the coupling parts and to release the toggle links and the gripping members.

6. A theft-proof, self connecting lock coupling device for helicopters, tow submarines and the like, as defined in claim 5, and locking levers pivotal upon the body of the first coupling part and engageable with the spring compression toggle operating linkage means, said locking levers being connected to cables suspended from a helicopter and pivotable into a locking position to hold toggle parts locked against the action of the compression spring upon the coupling device and the connected goods container being lifted from the ground and the cables placed under strain.

7. A theft-proof, self-connecting lock coupling device for helicopters, tow submarines, and the like as defined in claim 1, and said hitch pin having a central opening, a trigger pin slidable in said opening adapted to be extended therefrom, a spring biasing said trigger pin to its extended position, said power means for operating the hitch pin comprising a jack screw and a reversible motor, normally upon switch means on the hitch pin engageable by the trigger pin upon the trigger pin being depressed by engagement of the one coupling part with the other coupling part and upon release of the coupling parts said trigger pin upon being extended serving to effect the actuation of said reversible motor and the retraction of the hitch pin, limit switch means on the other coupling part and engageable by the hitch pin to arrest the retracting movement of the hitch pin and said key operated means being a lock switch actionable upon insertion of a key to reverse the operation of the reversible motor and of the jack screw to extend the hitch pin.

8. A theft-proof, self-connecting lock coupling device for use with helicopters, tow submarines and the like, as defined in claim 7 and solenoid means carried by the hitch pin for retracting the trigger pin after the hitch pin has been retracted and said limit switch means including means for effecting the energization of the solenoid means.

9. A theft-proof, self-connecting lock coupling device for use with helicopters, tow submarines and the like, as defined in claim 2, and said means for operating the grip members, toggle links extending between the grip members and the coupling to close and open the grip members upon the hitch pin, a two-way cylinder device on the coupling body and linkage means connecting the cylinder device with the toggle links to open and close the grip members.

10. In combination, a helicopter top drop coupling part comprising a coupling body having a transverse wall portion with a hitch pin opening thereunder and a skirt centering portion depending below hitch pin opening and a restrictive passage communicating therewith, hitch pin grip members pivotally connected to the transverse wall portion and depending into the hitch pin opening in central alignment with the restrictive passage and the skirt centering portion, toggle links extending laterally in the hitch pin opening and connected between the grip members and the side of the body, vertically extending toggle operating links connected to the toggle links to actuate the same and slidable upwardly through the transverse wall portion, a spring actuator device mounted on top of the wall portion and including a compression spring and a plunger actuated by the spring and slidable through the top wall portion for engagement with a hitch pin positioned within the grip members, a spider carried on the plunger, and extending from the spider fulcrumed upon the top wall portion and pivotally connected with the upper ends of the vertically extending toggle operating links, locking levers pivoted upon the top wall portion and engageable with the upper ends of the vertically slidable operating links to hold the toggle links over center and the grip members closed said body having an inturned lip at its upper end and the outer ends of the locking levers engageable with the inturned lip to limit the pivotal movement of the locking levers in their locking position, suspension cables connected to the locking levers so that the levers and lip assume the load of the coupling parts, and a bottom coupling part comprising a coupling body having a central hitch pin opening and a rounded nose position cooperable with the skirt portion of the top coupling part to center the coupling parts with one another, a hitch pin adjustable in the central hitch pin opening when the coupling parts are centered and extendable through the restrictive passage and in the hitch pin opening at the one coupling part and power-operated means on the bottom coupling body to extend and retract the hitch pin, said hitch pin having a ball-shaped head engageable by said grip members of the one coupling part, said ball-shaped head of the hitch pin engageable with plunger of the spring actuator device to compress the spring and effect the closing of the grip members about the hitch pin head.

11. The combination as defined in claim 10 and said power-operated means for extending and retracting the hitch pin including a jack screw connected to the hitch pin within the central opening and a reversible motor for and gear connected to jack screw to operate the screw and hitch pin and said hitch pin having a central opening through the ball-shaped head and a trigger pin spring biased from said opening, a switch on the hitch pin operable upon release of the hitch pin from the one coupling part to cause the rotation of the reversible motor and the retraction of the hitch pin, limit switch means on the coupling body and engageable with the hitch pin to arrest the retraction movement of the hitch pin, and key-operated switch means operable in opposite rotation to extend the hitch pin for further coupling of the coupling parts.

* * * * *